Figures 1, 2:
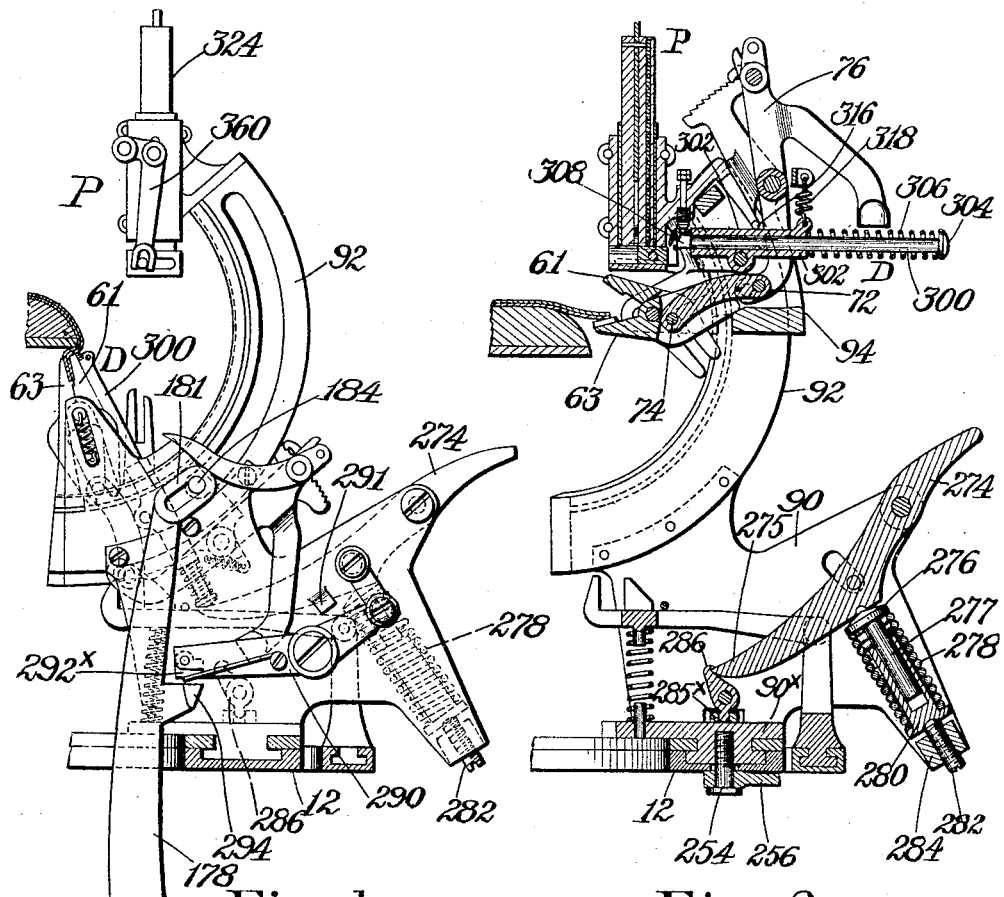

W. C. STEWART.
FASTENER INSERTING MEANS.
APPLICATION FILED JUNE 26, 1914.

1,118,968.

Patented Dec. 1, 1914.
3 SHEETS—SHEET 1.

WITNESSES

INVENTOR
William C. Stewart
by Robt P Harris
atty.

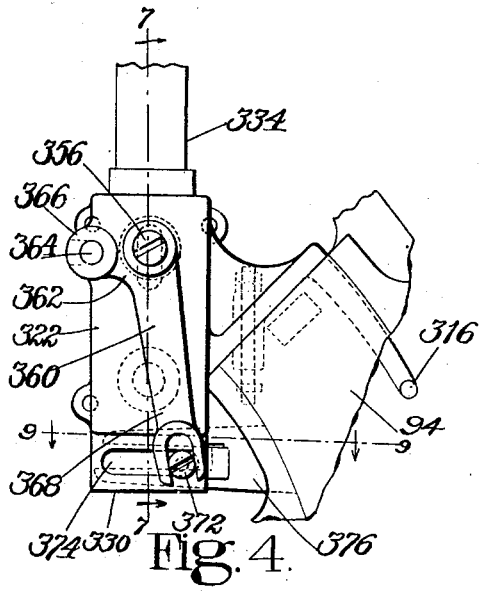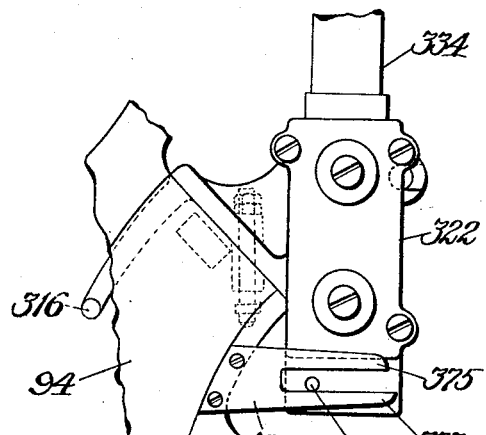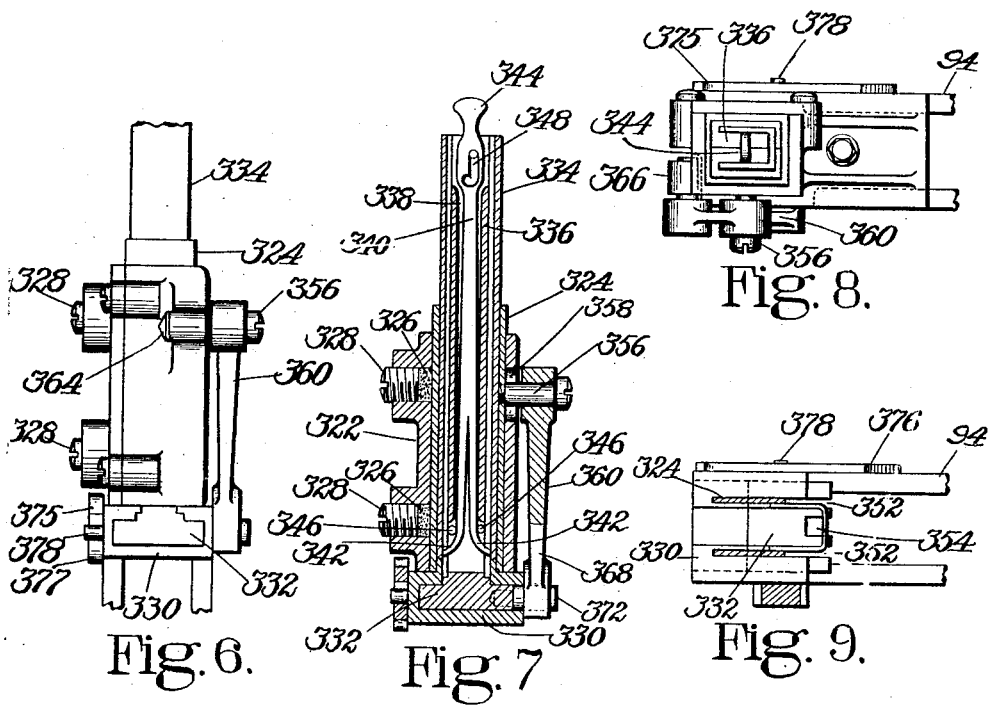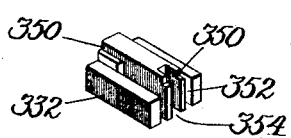

W. C. STEWART.
FASTENER INSERTING MEANS.
APPLICATION FILED JUNE 26, 1914.

1,118,968.

Patented Dec. 1, 1914.
3 SHEETS—SHEET 3.

WITNESSES.
Alice E. Cotter
Beatrice J. Smith

INVENTOR.
William C. Stewart
by Robt P Harris
atty.

UNITED STATES PATENT OFFICE.

WILLIAM C. STEWART, OF SWAMPSCOTT, MASSACHUSETTS, ASSIGNOR, BY MESNE ASSIGNMENTS, TO UNITED SHOE MACHINERY COMPANY, OF PATERSON, NEW JERSEY, A CORPORATION OF NEW JERSEY.

FASTENER-INSERTING MEANS.

1,118,968.  Specification of Letters Patent.  Patented Dec. 1, 1914.

Original application filed November 14, 1906, Serial No. 343,458. Renewed May 3, 1913, Serial No. 765,395. Divided and this application filed June 26, 1914. Serial No. 847,518.

*To all whom it may concern:*

Be it known that I, WILLIAM C. STEWART, a subject of King George V of Great Britain, residing at Swampscott, county of Essex, and State of Massachusetts, have invented an Improvement in Fastener-Inserting Means, of which the following description, in connection with the accompanying drawings, is a specification, like letters on the drawings representing like parts.

The invention to be hereinafter described relates to machines for the manufacture of boots and shoes, and more particularly to means for presenting and inserting fasteners or other metallic pieces into boot or shoe materials for securing parts together or for other purposes.

Where separate fasteners or the like have heretofore been furnished from a source of supply in bulk to fastener inserting means, it has been the usual practice to provide a magazine or other holder for a quantity of such fasteners and direct the individual fasteners therefrom through a conduit or by fastener separating means or both, to the inserting position, whereupon the inserting or driving mechanism would act upon the positioned fastener or the like and drive it into the boot or shoe material. These expedients have been satisfactory to a large extent, but conditions frequently arise which make it desirable that from the time a fastener is furnished at the source of supply until it is finally driven, it shall be under positive control; and one of the aims and purposes of the present invention is to provide means which shall take positive control of a fastener at the source of supply and maintain said control as the fastener is moved to driving position and is finally driven into the shoe material by the fastener inserting mechanism.

In carrying the invention into practical effect, a good embodiment thereof is furnished by a fastener inserting or driving means which shall positively engage a fastener at the source of supply, carry it from this point to the driving position, and then drive the fastener; and as a further purpose of the invention, a fastener presenting mechanism is provided to present fasteners to be taken by the inserting or driving means,—all as will more fully appear from the following description and accompanying drawings of one practical embodiment of the invention, it being understood that the invention is not restricted thereto, but in its true scope is defined by the claims. In the following exploitation of the present invention, it is shown and described as associated with means for pulling the upper materials over a last to properly conform the upper to the contour of the last and lay the edge thereof in position for securing it in pulled-over position, all substantially as fully disclosed in the prior application, Serial No. 765,395, May 3, 1913, filed as a renewal of application Serial No. 343,458, November 14, 1906, of which the present application is a division; and while this serves to make clear some salient and important features of the invention, it is to be understood that such association is only for the exploitation of the invention, and that it is not restricted to this association or use, and may be advantageously employed in other relations where fasteners or the like are to be inserted or driven into the materials of boots and shoes.

While, in the present description, the term "fastener" is employed to designate the article or thing to be driven or inserted into the shoe material, it is to be understood that such term is used in its generic sense, and is intended to include any character of device that may be inserted either into or to secure shoe parts together, such as tacks, nails, staples, slugs and the like.

Figure 3:
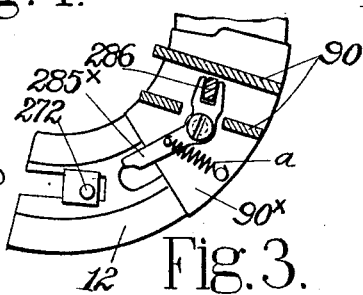
Figure 11:
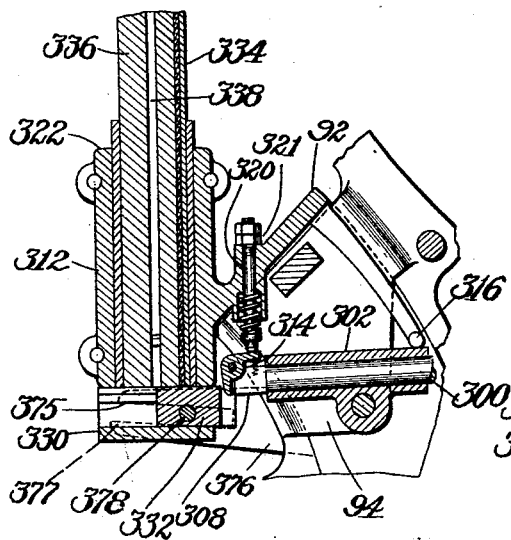
Figure 12:
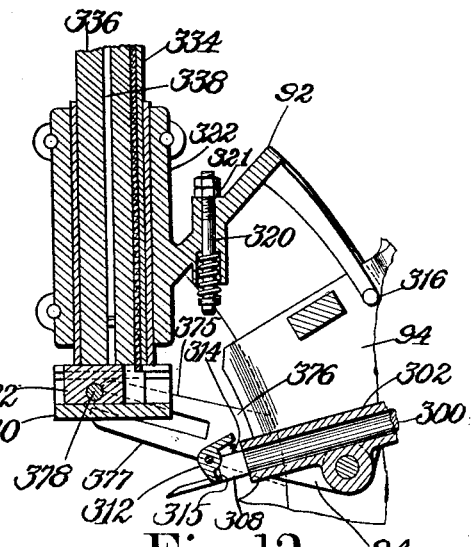
Figure 13:
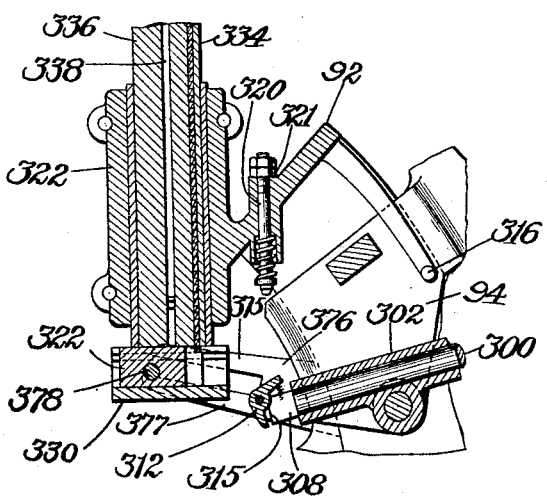

In the drawings:—Figure 1 is a side elevation showing the fastener presenting means, and the fastener driving or inserting means as having taken a fastener therefrom, carried it to driving position, and driven it into the shoe material,—parts of the pulling-over means being also shown, and a portion of the last and shoe in section or broken away; Fig. 2 is a sectional view longitudinally through the presenting and fastener inserting or driving means, showing the parts in a different position and the driving means about to take a fastener from the presenting means; Fig. 3 is a detached detail, showing one form of means for releasing the catch from the hammer to permit the latter to act. Fig. 4 is an elevation at one side of the fastener supplying and presenting mechanism; Fig. 5 is a like view at the opposite side thereof; Fig. 6 is a side elevation looking from the left toward the right, Fig. 4; Fig. 7 is a transverse section on the line 7—7, Fig. 4; Fig. 8 is a plan view of the parts shown by Fig. 4; Fig. 9 is a horizontal section on the line 9—9, Fig. 4; Fig. 10 is a detached perspective view of the presenter block; Fig. 11 is a detail vertical section of the presenter means and fastener inserting or driving means, showing the position of parts when the driver has just engaged a fastener; Fig. 12 is a view similar to that of Fig. 11, showing the fastener driver as having taken a fastener from the presenting mechanism and moved it toward driving position; and Fig. 13 is a similar view showing the relation of the fastener presenting mechanism and driver as the latter is approaching and just prior to reaching its position to engage a fastener.

As set forth in the prior application of William C. Stewart, No. 765,395, of which this is a division, a fastener presenting and fastener inserting or driving means is associated with each of the side and toe pulling-over means, but such differently associated fastener presenting and driving means are substantially the same; therefore, and for the purpose of making clear the characteristics of the present invention, the fastener presenting and driving means associated with one of the toe pulling-over means has been selected for illustration and description herein. Only such portions of the pulling-over means have been included as are necessary for a proper description of the present invention, because such pulling-over means forms no essential part thereof and is only embraced herein for showing one of the uses to which the invention may be advantageously applied.

Referring to Figs. 1 and 2, the fastener presenting mechanism as a whole is designated by P, the fastener inserting or driving mechanism by D, and from the association of the two it will be noted that the latter takes from the former a fastener by positively engaging the same, carries it from the presenting mechanism as in Fig. 2 into position for driving, and then by suitable actuating means the fastener inserting or driving mechanism while still positively holding the fastener drives it into the shoe material. In the application of the invention as illustrated, the fastener is taken from the source of supply and inverted as it reaches driving position and is driven upwardly by the driver, and while this is illustrative of an important adaptation of the present invention when associated with pulling-over means where the shoe or last is supported sole downward, it is to be understood, of course, that the broad features of the invention are not restricted thereto but are readily adaptable for the driving of fasteners whenever a positive control of the individual fastener is desirable or where the source of fastener supply is some distance from the driving point.

It is desirable preliminarily to briefly refer to the pulling-over means with which the present invention is herein shown associated.

Mounted on a suitable supporting frame is the grooved guide 12 in which is mounted for movement longitudinally of said groove, the gripper support 90 having a base portion 90$^x$. Rising from the gripper support 90 is the vertically arranged gripper carriage guide 92 curved in the arc of a circle, the center of which is preferably at or approximately at the edge of the last about which the upper materials are to be laid. Mounted for sliding movement in the guide 92 is the carriage 94, Fig. 1 and 2, carrying the pivoted gripper jaws 61 and 63 having slotted tail portions in which operates a pin 74 for opening and closing the jaws. The pin 74 is carried by a link 72 pivotally connected to a lever 76 which may be actuated as set forth in said prior application to close and open the jaws, but as this mechanism forms no essential part of the present invention, description and illustration thereof are unnecessary, and reference may be had to said prior application for such further explanation of the construction and operation as is desired. After the gripper jaws have grasped the upper material and the upper and last have been properly positioned relatively as stated in said earlier application, the gripper carriage 94 is moved downward on the curved guide 92 to place the upper beneath the insole of the shoe by suitable means such as the actuator 178 preferably power operated, as fully described in said prior application and engaging by its slotted end 181 a pin 184 projecting from the carriage 94. In the machine described by said earlier application, there are preferably employed two toe grippers and two gripper supports and carriages, so that as the grippers are carried downward to place the upper beneath the insole, as indicated in Fig. 1, said toe gripper carriages are relatively moved laterally in a direction of separation as by means of arms 256 engaging pins 254 secured to the base portions 90$^x$ of the gripper supports. Since at the end of such lateral separating movement of the toe gripper supports, the upper is in position to be secured to the insole, advantage is taken of such movement to trip a catch, which normally holds the fastener driving element inoperative, and free the driving element to the performance of its driving function,—all as fully set forth in said earlier application. The stretched upper having been brought in position to be secured, it is desirable to provide means for inserting the fasteners of some kind, through the upper and into the insole to hold the former in position when the shoe is removed from the machine. Referring in the first place to the actuating means for the fastener driver, and having reference to Figs. 1 and 2, each of the gripper supports 90 has pivoted thereto a hammer lever 274, the upper surface of which is preferably curved concentrically with the vertical guides of the gripper supports. This hammer lever may be actuated in any suitable manner to cause the drivers to insert or drive the fastener through the upper into the insole, but as shown they are actuated by suitable springs. In the particular construction illustrated, the hammer lever bears upon a conical block 276 provided with a pin 277 fitting within one end of a coil spring 278, the other end of which bears upon the collar of a sleeve 280 having a socketed bearing upon a screw 282 threaded into a lug 284 upon the gripper support. The tension of the spring 278 may thus be regulated by the screw 282. The spring 278 normally keeps the hammer 274 elevated, turning the same about its pivot. The hammer is thus maintained in the elevated position with the spring 278 under compression, by means of a spring-pressed latch 286 carried by the gripper support and adapted to move into bearing engagement with the hammer surface 275. The spring 278 is appropriately compressed by suitable mechanism, as by devices on the actuating rod 178 and the lever 290, Fig. 1. The particular construction in the illustrated form of the invention comprises a boss 294 on one side of the actuating rod 178 adapted to engage a spring-pressed pawl 292˟ on the lever 290. On the down-stroke of the actuating rod 178, this pawl yields and allows the boss 294 to pass, but on the up-stroke of the actuating rod 178, the pawl is held from movement relative to the lever 290 by engaging a portion thereof, and the levers therefore move in a direction to compress the hammer spring 278. The outward movement of the actuating rod 178 withdraws the boss from beneath the pawl at the time the latch 286 engages the hammer surface 275 to hold the hammer in retracted position.

In the preferred form of fastener inserting mechanism, when associated with the pulling-over means as herein illustrated, the carriage 94 in addition to carrying the grippers, has mounted upon it a driver bar 300, preferably carried with a sleeve 302 pivoted upon the carriage 94. This driver bar 300 is provided at its outer end with a head or button 304, Fig. 2, and carries between said button and the sleeve 302, a spring 306 of some strength, but weaker than the spring 278, for normally keeping the driver bar retracted and the driver head 308 in engagement with the inner end of the sleeve 302.

With the last supported in the machine bottom down, the fasteners must be driven into the insole upwardly, and therefore it is desirable to use means other than gravity for obtaining a fastener from a source of supply and placing it in position to be driven by actuation of the driver 300, through the hammer 274. Frequently, also, on account of the location of or form of discharge from the source of fastener supply, the fasteners need to be partially or wholly inverted individually while being conveyed to driving position. The driver is therefore provided with means for positively engaging the fastener at the source of supply, so that such fastener may be carried by the driver from the source of supply to driving position. The driver thus forms, in effect, means for conveying a fastener into proper position for insertion or driving, and for holding the fastener in such position until inserted or driven. Various means may suggest themselves for thus positively engaging a driver at the point of supply and for holding it as above-described; but in the present form of this feature of the invention, there is mounted upon the driver head 308, a small, two-armed lever 312, having one of its arms bearing upon a spring 314 resting in a suitable socket on the top of the driver head 308, its other end forming a spring-pressed catch, which in the absence of a fastener between such catch and the head, will normally bear upon the end of the driver head. This catch is adapted to engage the under surface of the head of the fastener and hold said head firmly against the head of the driver with the fastener preferably extending in alinement with the driver.

In the present instance, it is preferable to use multi-pointed fasteners, such, for instance, as staples, for the reason that such fasteners provide in one piece, a plurality of holding parts to secure the upper properly in place; and such multi-pointed fasteners are especially desirable where the upper material is corrugated or fluted, because in such case a better holding function is found to exist by the use of such multi-pointed staples or fasteners. Furthermore, the staples are more readily handled, and more quickly and easily removed from the work if such removal is found necessary than if single tacks were used, as is now customary. It is to be understood, however, that the present invention is not to be regarded as limited to the use of staples, as the form of driver herein described may be readily adapted to carry various kinds of fasteners. Inasmuch, however, as staples have some advantages under the conditions above-stated, the present invention will be described as used in connection therewith.

In using staples as the type of fastener desired, the driver head 308 is provided with a transverse shoulder 315, Fig. 13, against which the head of the staple rests when met by the catch 312 in position against the head of the driver, the said shoulder aiding and maintaining the shoulder in proper alinement with the driver. The gripper support 92 is provided with an abutment, such as the pin 316, against which the sleeve 302 on the outer side of its pivotal point passes when the gripper carriage is in the upper end of its curved guide; and said carriage is connected to the sleeve 302 by a light spring 318 located in such position as to normally maintain the driver 300 in engagement with the upper side of the gripper jaw 61. The pin 316 is so positioned that when the gripper carriage reaches the upper end of its stroke, the driver will have been forced away from the jaw 61 and brought to a position to receive a fastener from the source of supply, see Fig. 2. This is the position it occupies during the time that the grippers are being closed upon the upper material preparatory to being moved downward in their curved guides. The gripper support 92 carries a spring-pressed plunger 320 against which the spring-pressed arm of the catch engages when the carriage is at the top of its stroke, thus keeping the catch open for the reception of a fastener.

It is appropriate at this time to describe the means for supplying fasteners, which in the present instance are staples, to be engaged and taken by the driver, such means being best shown by Figs. 4 to 9 inclusive. The gripper support has secured thereto, a vertically arranged casing 322. This casing is designed to sustain the supply of staples for the driver and also the means for selecting them one at a time and presenting such selected staple to the catch upon the driver head. Within the casing 322 and supported thereby, is a longitudinally-movable sleeve 324, Fig. 7, held in any particular position to which it is moved by any suitable means, such as the friction pad 326, Fig. 7, sustained by the casing and held in position by the screw 328. The sleeve 324 is provided with a lower box-like end 330 forming a horizontally-arranged guideway for the block 332, Fig. 7, which closes the lower end of the sleeve. This block is constructed and arranged to receive fasteners from a source of supply and present them to the driver in position to be engaged by the catch 312 and for convenience will hereinafter be termed a presenter, or presenter block.

Any convenient means may be used for supplying staples to the presenter block 332, but in the present form of the invention such means is shown as an open-ended container 334, Figs. 4 and 7, in which a number of staples are placed, one upon the other, so that the entire column so formed will rest upon the presenter block under the force of gravity. The presenter block is so constructed that upon each forward movement with its guideway it will carry the lowermost staple of the column into position to be engaged and held by the driver head and thereafter carried by it into driving position, the block being then returned again beneath the column of staples which have settled down so that they again rest upon its surface. Preferably these containers 334 are portable members, and therefore means should be provided for holding the staples therein while they are carried to the machine and placed within the sleeve 324. To this end each container is preferably provided with a central longitudinal abutment 336, Figs. 7 and 8, extending from one side but leaving sufficient space between it and the other sides for the reception of the staples. The container thus forms, in effect, a chute for the staples. The abutment 336 is provided with a central aperture 338 through which extends a locking rod 340 provided at its lower end with a pair of curved spring fingers 342 which bear against the sides of the container and extend beneath the column of staples, preventing them from passing out of the open bottom. The locking rod 340 is provided with a thumb-piece 344, so that after the container is placed within the sleeve 324, the rod may be drawn upwardly, whereby the spring fingers 342 are drawn inwardly from without, the fingers, by their curved surfaces, riding past the friction rollers or pins 346 carried in the lower end of the abutment 336, the construction being such that the staples may then be allowed to drop until they rest upon the upper surface of the presenter block 332 in position to be selected one by one for insertion. The locking rod 340 is maintained in retracted position by the pin and slot connection 348 between it and the abutment 336, as indicated in Fig. 7.

The presenter block 332 is shown most clearly in Fig. 10 and is provided with a recessed surface forming a cutaway portion 350 extending along either side of the top and across the front end, within which the lowermost staple of the column in the container 334 rests, the construction being such that the block may be moved forwardly in its guide 330 carrying the lowermost staple with it until the staple head projects beyond the wall of the casing 322. The presenter 332 is also provided with grooves 352, Fig. 10, in its front end or face extending backward for almost the length of the shanks or legs of the staples, and a central vertically-arranged groove 354, Fig. 10, just back of the head and staple when it rests in the cutaway portion 350. The sleeve 324 is provided with a pin 356, Figs. 4 and 7, extending through a slot 358 in the casing 322, and on this pin is pivoted a lever 360 having a short arm 362, Fig. 4, provided with a pin 364 which projects into a bearing 366 on the casing 322, and a longer arm 368 embracing a pin 372 upon the presenter block 332, and extending through a slot 374, Fig. 4, in one side of the guide 330.

From the construction described, it will be seen that if the sleeve 324 be given a movement in one direction the arm 368 of the lever 360 will be given a motion about the pivot pin 364 as a center, whereby the presenter block 332 will be moved in one direction, and conversely, a movement of the sleeve 324 in the other direction will, through the same connections, move the presenter block in the opposite direction.

As herein shown, the connections are so arranged and disposed that a downward movement of the sleeve 324 will retract the presenter block within its guideway 330, while when the sleeve is moved upwardly, the presenter block is forced outwardly so that it projects beyond the end of the guideway 330 with its end beneath the fastener engaging means on the head of the driver and in such position that the head or cross bar of the staple carried by the presenter block is in position to be engaged by the catch 312, and between it and the head of the driver 308. When the gripper carriage and driver are at the top of their stroke, the sleeve 324 is up and the presenter block 332 is in its outward position, as will be readily understood.

Any suitable means may be employed for giving proper movement to the sleeve 324 to carry into effect its described function of presenting a fastener to the gripping means on the end or head of the driver; but as herein shown as the present embodiment of the invention, said means comprises a forked arm 376 mounted to have movement with the gripper carriage 94 and preferably upon the carriage itself. The upper arm 375 of this fork is somewhat shorter than the lower arm 377. When the gripper carriage is at the upper end of its stroke, the lower arm 377 is in engagement with a pin 378 projecting from a convenient part of the sleeve 324 and of less diameter than the space between the arms 375 and 377. As the gripper carriage starts to move down in its curved guideway, it carries the driver 300 with it and no downward movement is imparted to the sleeve 324 and the arm 375 engages the pin 378. During this lost motion the driver has been carried down sufficiently to bring the head of the staple resting upon the now forwardly-extending presenter block, the catch 312 passing into the vertical slot 354 in the presenter block. The catch 312 on the driver is maintained open so that the staple may be entered behind it, by means of the spring-pressed plunger 320, which, through its spring, follows the driver in its descent and prevents further downward movement of the plunger, at which time, however, the staple has been placed against the shoulder 315 and is in proper position to be positively engaged by the catch 312 to hold it upon the driver head, Fig. 11. At this time, the head of the driver is being forced downwardly by the action of the spring 318 upon the sleeve 302, such movement tending to bring the driver head against the upper surface of the gripper jaw 61. At this time also, the arm 375 begins to bear upon the pin 378 and carries the sleeve 324 downwardly with it, which motion of the sleeve acts to retract the presenter block 332 in its guideway 330 as heretofore explained, see Fig. 12. Owing to the curved line in which the gripper carriage descends, the forked arm 376 tends to slide over the pin 378, the arm, however, being made long enough to engage the pin for a sufficient length of time to move the presenter block 332 in proper position beneath the column of staples, and for receiving upon its cutaway portion 350, the staple now at the bottom of the column. As the presenter block is retracted, the driver 300 carrying a staple, continues to move down with the carriage 94, the legs of the staple passing down through the side slots 352 in the presenter block, as the latter is being retracted. The spring 318 having brought the driver head against the upper side of the gripper jaw 61, the driver and gripper both travel together in this relation down the curved guide in the gripper support, and in their descent, the button 304 on the end of the driver, engages the surface 275 of the hammer 274, the spring 306 yielding, if necessary, during this engagement, and continuing to yield until the upper has been placed in the position for inserting the fasteners or staples still carried positively by the head of the driver. When the upper has reached this position, owing to the gripper movement as pointed out in said prior application, the latch 286 which holds the hammer 275 in retracted position, is tripped and the hammer is allowed to move forward under the action of the spring 278 to impart a driving blow to the driver 300 and insert the staple or fastener through the upper and into the insole.

Any suitable means may be employed for tripping the catch 286 in order to free the hammer as above indicated, but in the particular form of this feature of the invention, as illustrated in the present embodiment thereof, such release is effected by means of a pin 272, which acts against the free end of a pivoted tail piece 285ˣ as the carriage support 90 is moved laterally in its guideway 12, said catch being held in hammer engaging position by means of a spring q, Fig. 3.

As the fasteners or staples used in securing the upper to the insole are frequently withdrawn when the shoe is lasted, it is preferable to insert the fasteners only part way, and to this end a lug 291 is mounted on the gripper support adjacent the lever 290 so that upward movement of the lever and the connected hammer 274 is limited that the blow from the hammer will effect only a partial drive. This result is also further insured by reason of the construction of the driver head. As the fastener holding catch 312 rises between the head of the fastener and the upper material, the fastener is absolutely prevented from being driven beyond a point where this catch engages the upper.

After the fasteners have been inserted through the upper and into the insole, the carriage carrying the grippers, drivers and related mechanism, must be moved back to the upper end of the curved guideway in position to enable the drivers to seize another fastener for the succeeding operation, and this is preferably done automatically by the same means which brings the gripper carriage down and carries the drivers into driving position. Likewise, it is necessary to reset the hammer in order that it may be in operative condition to again perform the driving function when the next fastener is carried by the driver into driving position. The gripper carriage being at the bottom of its stroke, the pin 184 is in the upper end of the slot formed in the actuator 178, as indicated in Fig. 1, and before any upstroke will be imparted to the gripper carriage, there will be loose play between the actuator 178 and pin 184 until the lower end of the slot engages said pin. During this preliminary rising movement of the actuator 178, the boss 294 carried thereby, engages the pawl 292ˣ on the setting lever 290, thereby turning said lever in a direction to compress the spring 278 until the surface 275 at the lower end of the hammer passes into engagement with the catch 286, at which time the boss 294, by its inward movement, passes from engagement with the pawl 292ˣ on the continued upward movement of the actuator 178. The resetting movement of the hammer as above described, allows the spring 306 associated with the driver 300 to expand, and the nose of the catch being in engagement with the now driven staple, causes the catch to open. Further expansion of the spring 306 withdraws the driver from engagement with the driven staple and carries the driver away from the shoe through the sleeve 302. Further upward movement of the actuator 178 moves the carriage 94 upward in its guideway to return the gripper jaws and driver to initial position at the upper portion of the guide 92, substantially as indicated in Fig. 2. As the driver approaches its upper position, the lower arm 377 of the fork 376 carried by the carriage, engages the pin 378 on the sleeve 324 of the fastener presenting mechanism, thereby moving said sleeve upward against the force of the friction blocks 326, and at the same time operating the lever 360 to bring the presenter block 332 with the lowermost staple of the column in the container, beyond into position beneath the head of the driver 300, which has at this time passed the lever of the block 332, so that on the next downward movement said staple may be in position to be engaged by the driver in the manner as heretofore explained. It will be understood that on upward movement of the driver 300, the pin 316 will be engaged by the sleeve 302 of the driver before the gripper carriage reaches its upper position, and the driver sleeve will therefore be turned about its pivot against the tension of the spring 318 until when the gripper carriage reaches its upper position of rest, the driver has been raised into substantially the plane above the presenter block, as is desired. At this time, also, the spring-pressed arm of the catch 312 has engaged the plunger 320, compressing its spring and forcing it upwardly somewhat, but also compressing the spring 314 of the catch and thus maintaining the catch in open position ready to engage between itself and the driver head, a fresh staple to be carried to the driving point and driven.

Claims:

1. In a machine for driving fasteners, the combination of a source of fastener supply, a driver constructed and arranged to grasp a fastener at the source of supply and carry it to driving position, and means for actuating the driver to partially drive a fastener while still held by the driver.

2. In a machine for driving staples into boots and shoes, the combination of a source of supply, a driver, means carried by the driver for engaging the crown of the staple at the source of supply and carrying it to driving position, and means for actuating the driver for partially driving the staple while still held by said first-named means.

3. In a machine for partially driving fasteners into a boot or shoe, the combination of a source of supply, a driver, a relatively movable catch carried by the driver and constructed and arranged to engage the head of a fastener at the source of supply and carry the fastener to driving position, and means for actuating the driver to partially drive the fastener while still held by the catch.

4. In a boot and shoe treating machine, a driver constructed to engage and hold a fastener or the like to be driven, means for moving the driver from the position where it received the fastener or the like to driving position, means for giving the driver its driving movement to partially insert the fastener or the like held by it, and means to thereafter retract the driver and disengage the fastener after it is partially driven.

5. In a machine for inserting fasteners into boots and shoes, the combination of a source of fastener supply, fastener inserting means movable from the source of supply to driving position, and means constructed and arranged with respect to the fastener inserting means to grasp a fastener at the source of supply and carry it to driving position and be tripped from engagement with the fastener by retractive movement of the driver after the fastener has been driven.

6. In a machine for inserting fasteners into boots and shoes, the combination of a source of supply, a driver, a catch pivotally mounted at one side of the center of the driver and constructed and arranged to engage a fastener at the source of supply and carry it to driving position, means for giving the driver its driving stroke, and means for retracting the driver and thereby tripping the catch from engagement with the fastener after it has been driven.

7. In a machine for inserting fasteners or the like into boots and shoes, a driver provided with a catch to engage a fastener, means for presenting a fastener to said driver, and means for maintaining said catch open until the fastener is in position to be engaged, and for thereafter automatically releasing the catch.

8. In a machine for inserting fasteners or the like into boots and shoes, a driver provided with a normally closed catch to engage a fastener, means for presenting a fastener thereto, and a plunger constructed and arranged to engage the catch and maintain it open until the fastener is in position to be engaged.

9. In a machine for inserting fasteners or the like into boots and shoes, a driver provided with a normally closed catch to engage a fastener, a fastener presenter, means for moving said driver past the presenter to engage the fastener, a spring pressed plunger constructed and arranged to engage the catch and maintain it open until the fastener is in position to be engaged, and means to thereafter disengage said plunger from the catch.

10. In a machine for driving staples into boots and shoes, the combination of a source of supply, a driver having a movable catch to clamp the cross-bar of the staple between it and the head of the driver and hold the staple until the driving operation has been completed, and means to thereafter retract the driver and thereby free the catch from the staple.

11. In a machine for driving staples partway into boots and shoes in an inclined direction, the combination of a source of supply, a driver constructed and arranged to grasp a staple at the source of supply and carry it to driving position, means for moving the driver from the source of supply into a position inclined to the surface of the boot or shoe into which the staple is to be driven, and means for actuating the driver to complete the driving of the staple part-way into the boot or shoe in an inclined direction while still grasped by the driver.

12. In a machine for inserting fasteners in boots and shoes, a fastener presenter, actuating means for moving the presenter in two directions at an angle to each other, a driver constructed and arranged to grasp a fastener at the presenting means and carry it to driving position, and means to thereafter actuate the driver to partially drive the fastener while still in the grasp of the driver.

13. In a machine for driving fasteners into boots and shoes, a fastener presenter mounted for movement in two directions, actuating means for moving the same in one direction, connections between said means and presenter so arranged that the presenter is moved in another direction, and a driver for taking a fastener from the presenter and carrying it to driving position.

14. In a machine for inserting fasteners in boots and shoes, a fastener presenter mounted for movement in two directions, actuating means for moving the same in one direction, and connections between said means and presenter so arranged that the presenter is moved in another direction.

15. In a machine for inserting fasteners in boots and shoes, a staple presenter comprising a block having a recessed surface to receive a staple and provided with backwardly-extending grooves to afford passage for the legs of the staples, and a centrally arranged groove at the front thereof to receive the head of the staple.

16. In a machine for inserting staples, the combination of a source of staple supply for presenting staples singly, staple inserting means having provisions for grasping a staple at the source of supply and carrying it to driving position, and means carried by the staple inserting means permitting the staple to be only partially driven.

17. In a machine for driving staples partly into a boot or shoe, the combination of a source of supply, a driver having a shoulder, a catch pivoted to the driver at one side of the shoulder and constructed and arranged to grasp the head of a staple between the legs thereof at the source of supply and carry it to driving position, means for imparting the driving stroke to the driver to partially drive the staple, and means to retract the driver after the staple has been driven and thereby tilt the catch to release the staple.

In testimony whereof, I have signed my name to this specification, in the presence of two subscribing witnesses.

WILLIAM C. STEWART.

Witnesses:
ERIC A. HOLMGREN,
HAROLD E. KENYON.

Copies of this patent may be obtained for five cents each, by addressing the "Commissioner of Patents, Washington, D. C."